United States Patent [19]

Sander et al.

[11] Patent Number: 4,658,706
[45] Date of Patent: Apr. 21, 1987

[54] CAST LIGHT METAL COMPONENT FOR INTERNAL COMBUSTION ENGINES

[75] Inventors: Wilfried Sander; Siegfried Mielke, both of Neckarsulm; Dieter Eschenweck, Mosbach, all of Fed. Rep. of Germany

[73] Assignee: Kolbenschmidt Aktiengesellschaft, Neckarsulm, Fed. Rep. of Germany

[21] Appl. No.: 833,649

[22] Filed: Feb. 25, 1986

Related U.S. Application Data

[63] Continuation of Ser. No. 618,102, Jun. 7, 1984, abandoned.

[30] Foreign Application Priority Data

Jun. 11, 1983 [DE] Fed. Rep. of Germany ....... 3321212

[51] Int. Cl.$^4$ ................................................. F16J 1/04
[52] U.S. Cl. .................................... 92/213; 123/193 P
[58] Field of Search ...................... 164/97, 98; 92/213; 29/156.5 R; 123/668, 669, 193 P

[56] References Cited

U.S. PATENT DOCUMENTS

| | | | |
|---|---|---|---|
| 4,245,611 | 1/1981 | Mitchell et al. | 123/193 P |
| 4,318,438 | 3/1982 | Ban et al. | 164/97 |
| 4,498,219 | 2/1985 | Ban et al. | 92/213 X |

FOREIGN PATENT DOCUMENTS

| | | | |
|---|---|---|---|
| 162042 | 3/1955 | Australia | 123/669 |
| 2092709 | 8/1982 | United Kingdom | 123/193 P |

Primary Examiner—Edward K. Look
Attorney, Agent, or Firm—Sprung Horn Kramer & Woods

[57] ABSTRACT

A cast light metal piston for internal combustion engines is provided with a ceramic insert in those zones which are highly thermally stressed and/or for heat insulation. To form a high-strength bond between the light metal and the insert, high-strength fibers are embedded in the light metal in the zone adjoining the insert.

22 Claims, 2 Drawing Figures

Fig.1
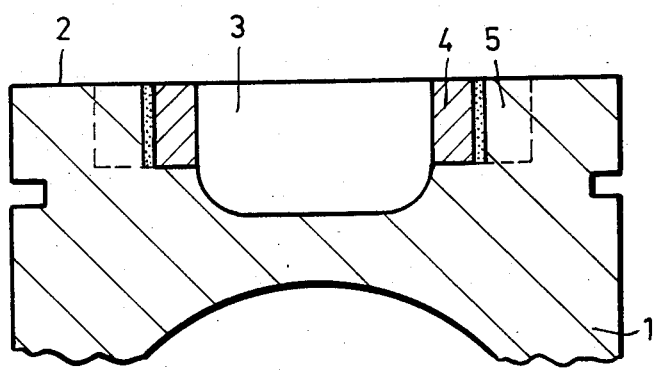
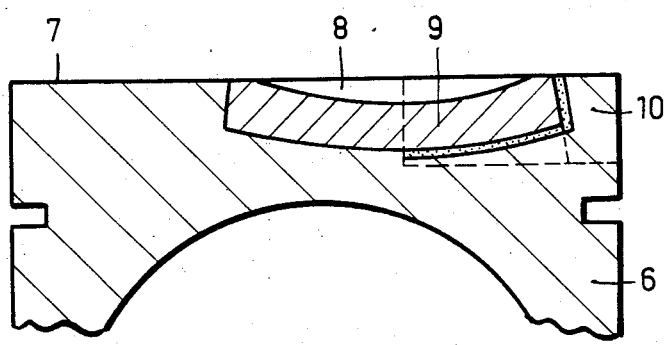
Fig.2

CAST LIGHT METAL COMPONENT FOR INTERNAL COMBUSTION ENGINES

This is a continuation of application Ser. No. 618,102, filed June 7, 1984, now abandoned.

BACKGROUND OF THE INVENTION

1. Field of the Invention

This invention relates to a cast light metal piston consisting of an aluminium alloy or a magnesium alloy particularly an aluminium alloy of type AlSi12 Cu-NiMg, for internal combustion engines, in which piston an embedded, insert comprising a ceramic material having a low thermal conductivity of 0.1 to 5 W/mK, a low coefficient of expansion of 0 to $5\times10^{-6}$/K and a low modulus of elasticity of 1 to $5\times10^4$ N/mm$^2$ is provided in those zones of the piston head which are highly thermally stressed and/or for heat insulation as the trench of pistons of precombustion chamber engines or the rim of the combustion chamber recess of pistons of direct injection engines.

2. Discussion of Prior Art

In internal combustion engines the increasing requirements for a higher power per cylinder, for higher exhaust gas temperatures, for a limitation or decrease of the dissipation of heat through the cooling system and for a higher utilization of the energy content of the fuel by secondary measures, such as the use of exhaust gas turbochargers, involve high thermal stresses on the pistons and require a heat insulation of the pistons It has recently been attempted to avoid or at least reduce such stresses by the provision of protecting ceramic elements in the thermally stressed zones of light metal pistons of internal combustion engines. For instance, J. H. Stang in Designing Adiabatic Engine Components, Ser. No. 780,069, has proposed to provide a light metal piston with a screwed-on ceramic head, which is insulated from the base by steel discs. The head of such light metal piston may assume a temperature up to 900° C. Disadvantages reside in the manufacturing costs of a protecting ceramic element which has the required strength and in the relatively large dead space above the first ring groove.

The heat of another known light metal piston is formed with a combustion chamber recess and contains at the rim of said recess an embedded aluminum titanate ring, which has an adequate compressive strength. Aluminum titanate (Al$_2$TiO$_5$) is a ceramic material which has a low thermal conductivity ($\lambda=2$ W/mK), a low coefficient of expansion ($\alpha=1.5\times10^{-6}$/K), a low modulus of elasticity ($E=2\times10^4$ N/mm$^2$), a very high fatigue strength and a high thermal shock resistance. After the casting operation the solidifying light metal contracts so as to form a shrinkage joint between the ceramic ring and the surrounding light metal. The resulting compressive stresses ensure the fixation of the ring and give rise to compressive stresses in the ring.

Because the light metal piston is deformed during the operation of the engine, the piston will be subjected adjacent at its head to tensile and compressive stresses and the resulting tensile stresses in the ring will be superimposed on the compressive stresses which are due to the shrinkage fit. As long as the compressive stresses in the ring exceed the tensile stresses, there will be no or only low tensile stresses in the ring itself. That condition is decisive for the service life of the ring because ceramic materials as a rule will withstand much higher compressive stresses than tensile stresses without failure.

For instance, the highest permissible tensile stresses for aluminum titanate are below 40 N/mm$^2$ whereas the material will not fail under compressive stresses up to ten times that value. For this reason a fracture or loosening of the ring will be avoided with adequate safety as long as the compressive stresses are sufficiently high relative to the tensile stresses. But this is not ensured during a prolonged operation of the piston because the compressive stresses which are due to the shrinkage fit will decrease after a relatively short operating time of the piston as a result of creep and/or relaxation phenomena, which are due to the temperatures in excess of 250° C. arising in the light metal piston. The function of the light metal piston will be adversely affected by the resulting loosening or fracture of the ring and consequential damage must be expected.

For instance, for a cast light metal piston comprising an aluminum alloy of type AlSi12CuNiMg and comprising an aluminum titanate ring embedded at the rim of the combustion chamber recess it has been found that the initial compressive stress of about 60 N/mm$^2$ which was due to the shrinkage joint had decreased to 20 N/mm$^2$ after an operation for 100 hours owing to the constant elongation occurring at a temperature of 250° C. The creep and/or relaxation of the aluminum alloy give rise to high tensile stresses in the ring so that cracks are formed in the ring or the ring comes loose. This adversely affects the function of the piston. For this reason it has not been usual thus far to provide light metal pistons of internal combustion engines with embedded ceramic inserts in thermally highly stressed zones and/or for heat insulation of the piston head as the trench of pistons of precombustion chamber engines or the rim of the combustion chamber recess of pistons of direct injecting engines.

SUMMARY OF INVENTION

It is an object of the invention to provide cast light metal pistons of an aluminium alloy or a magnesium alloy for internal combustion engines, which pistons comprise embedded ceramic inserts, which are firmly bonded to the light metal.

This object is accomplished in accordance with the invention in that high-strength fibers are embedded in the light metal in the zone adjoining the insert.

Owing to the reinforcing fibers, the light metal has a high resistance to creep and relaxation, particularly at high operating temperatures, and a high bond strength between the light metal and the ceramic insert is achieved.

In accordance with a further feature of the invention the high-strength fibers may be embedded throughout the zone adjoining the insert or only in part of said zone.

If the insert is eccentrically disposed, the high-strength fibers are preferably embedded in that portion of the zone adjoining the insert in which said zone has the smallest wall thickness. A great improvement of the resistance to creep and relaxation can be achieved with a relatively low expenditure if the embedded fibers are provided only in part of the adjoining zone.

The fibers embedded in the light metal consist preferably of carbon, graphite or ceramic materials, such as Al$_2$O$_3$, Si$_2$, SiC or the like.

The fibers embedded in the light metal may consist of a single material or a mixture of materials.

The embedded fibers can suitably be in the form of a woven or non-woven fabric, a braid, a knitted fabric, a felt or a similar fibrous fabric. Similarly loose fibers which have not been formed into a fabric can be employed for that purpose.

The minimum width and height of the zone containing fibres is at least each 5 mm. The fibres embedded have a diameter of 0.3 to 10 μm.

The volume of the embedded fibres is at least 15 up to 50 Vol.-%.

In one prefered form a constructing a piston according to the invention, the fibres are placed into the casting mold before the casting of the light metal piston. If fibres are used which constitute a fabric, it has been found suitable to pressurize the molten light metal so that it can better enter the interstices between the fibres.

It is also suitable to impregnate the fabrics with a light metal alloy which is identical or similar in composition to the light metal of the piston before the fabrics are embedded during the casting operation.

The bond between the fabric and the light metals is formed by a fusion of the surface of the fabric. The separating oxide films are penetrated or flushed away as a result of suitable measures of casting technology.

In accordance with a further feature of the invention the fabrics may be shrunk-fitted on the ceramic insert before they are embedded during the casting operation.

BRIEF DESCRIPTION OF DRAWING

The invention is illustrated in the appended drawings in which:

FIG. 1 is a longitudinal sectional view of the upper portion of a cast aluminum alloy piston according to the invention; and FIG. 2 is a similar longitudinal sectional view of the upper portion of another cast aluminum alloy piston.

DESCRIPTION OF SPECIFIC EMBODIMENTS

Referring to the drawings in FIG. 1 the upper portion of a cast aluminum alloy piston 1 is shown having a piston head 2 formed with a combustion chamber recess 3, which is defined by an embedded hollow-cylindrical liner 4 consisting of aluminum titanate. The zone 5 adjoining the liner 4 is reinforced by a fabric, which consists of graphite fibers and has been shrunk on the liner.

FIG. 2 shows the upper portion of a cast aluminum alloy piston 6 having a piston head 7, which contains an embedded insert 9 of aluminum titanate. The insert 9 is eccentric and formed with a concave recess 8. Carbon fibers are embedded in the piston material in that portion 10 in which the zone adjoining the insert 9 has the relatively smallest wall thickness.

What is claimed is:

1. In a light metal piston containing a ceramic insert in the head of the piston consisting of a ceramic material having a low thermal conductivity, a low coefficient of expansion and a low modulus of elasticity, the improvement wherein said piston consists of a cast aluminum alloy consisting of AlSi12CuNiMg, and between said ceramic insert and said light metal piston there is a zone adjoining the insert comprising fibers in the form of a woven fabric, braid, knitted fabric or felt, embedded in the cast aluminum alloy in the zone with the fibers having a diameter of 0.3 to 10 μm and the minimum width and height of the zone containing said fibers is each at least 5 mm and wherein the interstices between the fibers are impregnated with aluminum to increase the bond strength of the fibers to the aluminum alloy by putting fibers in a mold and pressurizing the aluminum alloy.

2. A piston according to claim 1, wherein volume of said fibers in the zone is at least 15 and up to 50% of the volume of the zone.

3. A piston according to claim 1, wherein said ceramic material comprises aluminum titanate.

4. A piston according to claim 1, wherein said fibers are embedded in said light metal at all regions where said ceramic insert abuts the metal of said light metal.

5. A piston according to claim 1, wherein said fibers are embedded in only a portion of the zone between said light metal and said ceramic insert.

6. A piston according to claim 5, wherein said ceramic insert is disposed about the rim of a combustion chamber recess in the head of said piston.

7. A piston according to claim 5, wherein said insert is disposed about the recess in the head of said piston.

8. A piston according to claim 7, wherein said insert is eccentrically disposed in the head of said piston.

9. A piston according to claim 8, wherein said fibers are disposed in at least that portion of said zone between said light metal piston and said ceramic insert where the zone has the smallest wall thickness.

10. A piston according to claim 1, wherein said fibers comprises carbon, graphite or a ceramic material.

11. A piston according to claim 10, wherein said fibers comprise alumina silica or SiC or a mixture thereof.

12. In a light metal piston containing a ceramic insert in the head of the piston consisting of a ceramic material having a low thermal conductivity, a low coefficient of expansion and a low modulus of elasticity, the improvement wherein said piston consists of a cast aluminum alloy consisting of AlSi12CuNiMg, and between said ceramic insert and said light metal piston there is a zone adjoining the insert comprising fibers in the form of a woven fabric, braid, knitted fabric or felt, embedded in the cast aluminum alloy in the zone with the fibers having a diameter of 0.3 to 10 μm and the minimum width and height of the zone consisting said fibers is each at least 5 mm and wherein the interstices between the fibers are impregnated with aluminum to increase the bond strength of the fibers to the aluminum alloy by impregnating the fibers with the aluminum before embedding.

13. A piston according to claim 12, wherein volume of said fibers in the zone is at least 15 and up to 50% of the volume of the zone.

14. A piston according to claim 12, wherein said ceramic material comprises aluminum titanate.

15. A piston according to claim 12, wherein said fibers are embedded in said light metal at all regions where said ceramic insert abuts the metal of said light metal.

16. A piston according to claim 12, wherein said fibers are embedded in only a portion of the zone between said light metal and said ceramic insert.

17. A piston according to claim 16, wherein said ceramic insert is disposed about the rim of a combustion chamber recess in the head of said piston.

18. A piston according to claim 16, wherein said insert is disposed about the recess in the head of said piston.

19. A piston according to claim 18, wherein said insert is eccentrically disposed in the head of said piston.

20. A piston according to claim 19, wherein said fibers are disposed in at least that portion of said zone between said light metal piston and said ceramic insert where the zone has the smallest wall thickness.

21. A piston according to claim 12, wherein said fibers comprises carbon, graphic or a ceramic material.

22. A piston according to claim 21, wherein said fibers comprise alumina silica or SiC or a mixture thereof.

* * * * *

UNITED STATES PATENT AND TRADEMARK OFFICE
CERTIFICATE OF CORRECTION

PATENT NO. : 4,658,706

DATED : April 21, 1987

INVENTOR(S) : Wilfried Sander, et al.

It is certified that error appears in the above-identified patent and that said Letters Patent is hereby corrected as shown below:

Col. 2, line 66      Delete "$Si_2$" and substitute --$SiO_2$--

Col. 3, line 11      After "form" delete "a" and substitute --of--

Col. 6, line 2      Delete "graphic" and substitute --graphite--

Signed and Sealed this

Twenty-ninth Day of September, 1987

Attest:

DONALD J. QUIGG

Attesting Officer      Commissioner of Patents and Trademarks